(12) United States Patent
Otto et al.

(10) Patent No.: US 8,716,197 B2
(45) Date of Patent: May 6, 2014

(54) LUBRICATING COMPOSITIONS FOR USE WITH DOWNHOLE FLUIDS

(75) Inventors: Michael J. Otto, Cypress, TX (US); Dennis K. Clapper, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/588,641

(22) Filed: Aug. 17, 2012

(65) Prior Publication Data

US 2013/0217602 A1    Aug. 22, 2013

Related U.S. Application Data

(63) Continuation-in-part of application No. 10/792,056, filed on Mar. 3, 2004, now Pat. No. 8,273,689.

(51) Int. Cl.
*C09K 8/00*    (2006.01)
*C09K 8/06*    (2006.01)

(52) U.S. Cl.
USPC ............ 507/138; 507/105; 507/205; 507/267

(58) Field of Classification Search
USPC ........... 507/105, 138, 205, 267; 508/181–183
See application file for complete search history.

(56) References Cited

U.S. PATENT DOCUMENTS

| | | | |
|---|---|---|---|
| 3,047,494 A | 7/1962 | Browning | |
| 3,048,538 A | 8/1962 | Rosenberg et al. | |
| 3,761,410 A | 9/1973 | Mondshine et al. | |
| 3,840,460 A | 10/1974 | Sheldahl et al. | |
| 4,280,915 A | 7/1981 | Kercheville | |
| 4,293,427 A | 10/1981 | Lucas et al. | |
| 5,549,836 A * | 8/1996 | Moses | 508/183 |
| 5,618,780 A | 4/1997 | Argillier et al. | |
| 5,658,860 A | 8/1997 | Clark et al. | |
| 5,721,199 A * | 2/1998 | Moses | 508/183 |
| 5,776,867 A | 7/1998 | Przybylski et al. | |
| 6,110,877 A | 8/2000 | Roberts | |
| 6,403,537 B1 | 6/2002 | Chesser et al. | |
| 7,299,874 B2 * | 11/2007 | Welton et al. | 166/307 |
| 7,462,582 B2 * | 12/2008 | Komiyama et al. | 508/136 |
| 7,595,281 B2 * | 9/2009 | McDaniel et al. | 507/205 |
| 8,418,759 B2 * | 4/2013 | Moore et al. | 166/263 |
| 2012/0135897 A1 | 5/2012 | Dlugolecki | |

OTHER PUBLICATIONS

Geothermal Technologies Program 2012 Peer Review; High Temperature 300C Directional Drilling System; U.S. Department of Energy; May 8, 2012, 20 pp.

* cited by examiner

*Primary Examiner* — Ellen McAvoy
(74) *Attorney, Agent, or Firm* — Mossman, Kumar & Tyler, P.C.

(57) ABSTRACT

Adding a lubricant having a metal stearate and polytetrafluoroethylene (PTFE) to a downhole fluid may lubricate a first surface once the downhole fluid has been circulated within a subterranean reservoir wellbore. Friction, torque, and/or drag may be reduced when the lubricated first surface contacts a second surface. The first surface may be or include, but is not limited to a wellbore casing, a drill string, a pipe, a formation, a drill bit, a metal surface within a mud motor, formation evaluation tool, at least one drilling tool, and combinations thereof. One or both of the first and second surfaces may be metal. The downhole fluid may be or include, but is not limited to, a drilling fluid, a completion fluid, a fracturing fluid, a drill-in fluid, a workover fluid, and combinations thereof.

17 Claims, 3 Drawing Sheets

LUBRICATING COMPOSITIONS FOR USE WITH DOWNHOLE FLUIDS

CROSS-REFERENCE TO RELATED APPLICATION

This application claims is a continuation-in-part of prior U.S. application Ser. No. 10/792,056, filed Mar. 3, 2004, which is herein incorporated by reference in its entirety.

TECHNICAL FIELD

The present invention relates to lubricants usable within downhole fluids, and more particularly relates, in one non-limiting embodiment, to lubricants including at least one component, such as a metal stearate and/or polytetrafluoroethylene (PTFE) for lubricating a first surface that may be a wellbore casing, a drill string, a pipe, a formation, a drill bit, a metal surface within a mud motor, and combinations thereof.

BACKGROUND

A substantial portion of the time required for drilling operations, completion operations, and/or fracturing operations is consumed in replacing worn metal pieces and/or equipment used for these tasks. Excessively high torque and drag may cause excessively costly delays or interruptions during downhole operations. The metal surfaces also wear down due to frictional forces, resulting in reduced equipment life. These problems generally increase at high temperatures and/or high pressures.

Lubricants or lubricating agents may be added to a downhole fluid to reduce or decrease friction, torque, and/or drag between two surfaces. This may be especially important when one or both surfaces are metal surfaces, such as within a metal-metal motor. Drilling fluids, completion fluids, and fracturing fluids will be discussed in more detail.

Drilling fluids are typically classified according to their base fluid. In water-based fluids, solid particles are suspended in a continuous phase consisting of water or brine. Oil can be emulsified in the water which is the continuous phase. "Water-based fluid" is used herein to include fluids having an aqueous continuous phase where the aqueous continuous phase can be all water or brine, an oil-in-water emulsion, or an oil-in-brine emulsion. Brine-based fluids, of course are water-based fluids, in which the aqueous component is brine.

Oil-based fluids are the opposite or inverse of water-based fluids. "Oil-based fluid" is used herein to include fluids having a non-aqueous continuous phase where the non-aqueous continuous phase is all oil, a non-aqueous fluid, a water-in-oil emulsion, a water-in-non-aqueous emulsion, a brine-in-oil emulsion, or a brine-in-non-aqueous emulsion. In oil-based fluids, solid particles are suspended in a continuous phase consisting of oil or another non-aqueous fluid. Water or brine can be emulsified in the oil; therefore, the oil is the continuous phase. In oil-based fluids, the oil may consist of any oil or water-immiscible fluid that may include, but is not limited to, diesel, mineral oil, esters, refinery cuts and blends, or alpha-olefins. Oil-based fluid as defined herein may also include synthetic-based fluids or muds (SBMs), which are synthetically produced rather than refined from naturally-occurring materials. Synthetic-based fluids often include, but are not necessarily limited to, olefin oligomers of ethylene, esters made from vegetable fatty acids and alcohols, ethers and polyethers made from alcohols and polyalcohols, paraffinic, or aromatic, hydrocarbons alkyl benzenes, terpenes and other natural products and mixtures of these types.

There are a variety of functions and characteristics that are expected of completion fluids. The completion fluid may be placed in a well to facilitate final operations prior to initiation of production. Completion fluids are typically brines, such as chlorides, bromides, formates, but may be any non-damaging fluid having proper density and flow characteristics. Suitable salts for forming the brines include, but are not necessarily limited to, sodium chloride, calcium chloride, zinc chloride, potassium chloride, potassium bromide, sodium bromide, calcium bromide, zinc bromide, sodium formate, potassium formate, ammonium formate, cesium formate, and mixtures thereof.

Chemical compatibility of the completion fluid with the reservoir formation and fluid is key. Chemical additives, such as polymers and surfactants are known in the art for being introduced to the brines used in well servicing fluids for various reasons that include, but are not limited to, increasing viscosity, and increasing the density of the brine. Water-thickening polymers serve to increase the viscosity of the brines and thus retard the migration of the brines into the formation and lift drilled solids from the well-bore. A regular drilling fluid is usually not compatible for completion operations because of its solid content, pH, and ionic composition.

Completion fluids also help place certain completion-related equipment, such as gravel packs, without damaging the producing subterranean formation zones. The completion fluid should be chemically compatible with the subterranean reservoir formation and its fluids.

A fracturing fluid is injected into a well as part of a stimulation operation. Fracturing fluids may include water, proppant, and a small amount of nonaqueous fluids designed to reduce friction pressure while pumping the fluid into the wellbore. Such fluids often include gels, friction reducers, crosslinkers, breakers to reduce the viscosity of the gel, and surfactants. The type of additive added to the fracturing fluid is selected depending on the needs for improving the stimulation operation and the productivity of the well.

A drill-in fluid may be used exclusively for drilling through the reservoir section of a wellbore successfully, which may be a long, horizontal drainhole. The drill-in fluid may minimize damage and maximize production of exposed zones, and/or facilitate any necessary well completion. A drill-in fluid may be a brine-based fluid that contains solids having appropriate particle sizes (salt crystals or calcium carbonate) and polymers. Filtration control additives and additives for carrying cutting may be added to a drill-in fluid.

A workover fluid is a fluid for repairing or stimulating an existing production well for the purpose of restoring, prolonging or enhancing the production of hydrocarbons.

It would be desirable if the lubricants added to downhole fluids could better lubricate a first surface for reducing friction, torque, and/or drag when the surface contacts a second surface, particularly when one or both of the surfaces is metal.

SUMMARY

There is provided, in one form, a method for circulating a downhole fluid within a subterranean reservoir wellbore and lubricating a first surface with the downhole fluid. The downhole fluid may be or include, but is not limited to, a drilling fluid, a completion fluid, a fracturing fluid, a drill-in fluid, a workover fluid, and combinations thereof. The downhole fluid may include a lubricant having a component, such as but not limited to, a metal stearate and/or polytetrafluoroethylene (PTFE). The first surface may be or include, but is not limited to a wellbore casing, a drill string, a pipe, a formation, a drill bit, a metal surface within a mud motor, formation evaluation tool, at least one drilling tool, and combinations thereof.

There is further provided in another non-limiting embodiment a method for drilling a subterranean reservoir wellbore with a drilling fluid and reducing at least one property, such as friction, torque, drag, wear, operating temperatures of a first surface, corrosion, and combinations thereof when a first surface contacts a second surface where at least one of the surfaces is a metal surface. The drilling fluid may include a lubricant in an amount ranging from about 1 wt % to about 10 wt % of the total drilling fluid, and the lubricant may include a lithium stearate and polytetrafluoroethylene (PTFE). The first surface may be a wellbore casing, a drill string, a pipe, a formation, a drill bit, a metal surface within a mud motor, formation evaluation tool, at least one drilling tool, and combinations thereof.

In yet another embodiment, a downhole fluid comprising a lubricant is described. The lubricant may include at least one component, such as a metal stearate in an amount ranging from about 1 lbm/bbl to about 10 lbm/bbl of the total lubricant and/or polytetrafluoroethylene (PTFE) in an amount ranging from about 1 lbm/bbl to about 10 lbm/bbl of the total lubricant. The amount of the metal stearate may be the same or different from the PTFE.

In another non-limiting embodiment, the downhole fluid may be a water-based drilling fluid that includes the lubricant in an amount ranging from about 1 wt % to about 10 wt % of the total water-based downhole fluid. The metal stearate may be lithium stearate.

The lubricant appears to reduce friction, torque, and/or drag between at least two surfaces once the downhole fluid has been circulated within the subterranean reservoir wellbore.

DETAILED DESCRIPTION

Figure 1:
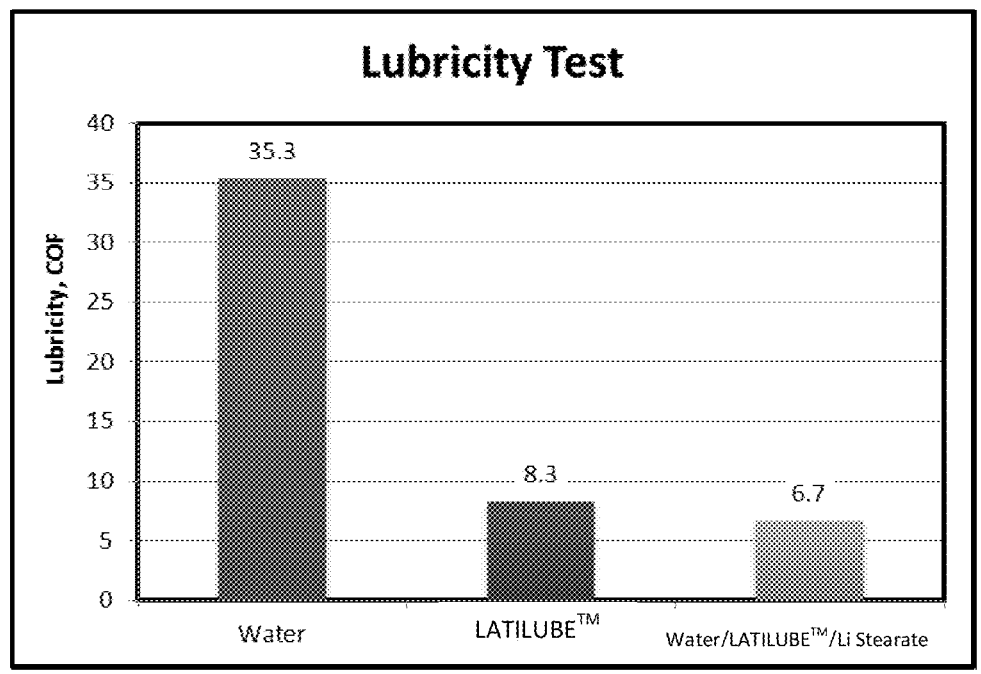
FIG. 1 is a graph illustrating the results of a lubricity test that compared the lubricity of water to a water/LATILUBE™ mixture and a water/LATILUBE™/lithium stearate mixture.

It has been discovered that adding a lubricant having at least one component, such as but not limited to a metal stearate and/or a polytetrafluoroethylene (PTFE or TEFLON™ from DuPont) to a downhole fluid may allow the downhole fluid to lubricate a first surface once the downhole fluid is circulated within a subterranean reservoir wellbore. The lubricant may reduce at least one property, such as friction, torque, drag, wear, operating temperatures of a first surface, corrosion, and combinations thereof when a second surface is applied to or contacts the first surface.

Alternatively, the lubricant may extend the life of a metal-metal motor by reducing friction, torque, and/or drag between two metal surfaces within the metal-metal motor. In one non-limiting embodiment, an elastomer, such as but not limited to a rubber, within the metal-metal motor may be eliminated from the stator when using the lubricant within a drilling fluid. By not having an elastomer therein, the metal-metal motor may perform better at higher temperatures and/or pressures. For example, the metal-metal motor may perform at up to about 400 C, alternatively up to about 300 C, or up to 100 C in another non-limiting embodiment. The metal-metal motor may also perform at a depth of up to about 15,000 meters below the surface, alternatively up to about 10,000 meters, or up to about 1,000 meters in another non-limiting embodiment.

The lubricants are compatible with a variety of downhole fluids in current use, and provide effective and consistent lubricating properties even at high pressures and/or high temperatures. The lubricants may form a coherent lubricating film on at least a first surface, and a lubricating film may form on additional surfaces as needed. At least one surface may be a metal surface. The film may cover metal surfaces to which it is exposed, or is "substantially continuous." As a result, merely including the lubricant in a downhole fluid extends the life of the drill string and casing.

The resulting lubricating film provides effective lubrication to surfaces subject to friction, such as the metal surfaces of a drill bit or other bearing surfaces, even under high temperature, high pressure conditions. Using a downhole fluid comprising the lubricant reduces torque and drag, prolongs bit bearing life, reduces friction wear between metal surfaces, e.g. between the drill string and the casing, and reduces corrosion. The lubricant may also reduce friction of the drill string on the formation, and/or reduce friction, torque, and/or drag between the drill bit and the directional motor. The lubricant may be considered 'effective' in reducing friction, torque, and/or drag between two surfaces when at least one of the properties is further reduced as compared to a downhole fluid circulated within a subterranean reservoir wellbore absent the lubricant. In an alternative embodiment, the lubricant may be considered effective when the property is further reduced as compared to a drilling fluid used to drill a subterranean reservoir absent the lubricant.

The lubricant may improve horizontal drilling rates by reducing torque and drag. The lubricant may reduce friction, which causes torque and drag; thereby, improving sliding efficiency and rate of penetration (ROP) in directional and extended-reach wells. The lubricant may withstand temperatures up to about 400 C, and it may also remain stable in calcium-based muds or other extremely high-pH fluids. Additives or conditions which cause flocculation, coalescence, or otherwise destroy the stable dispersion of the lubricant in the continuous phase are avoided.

In order to ensure that the lubricant remains as a dispersion, the lubricant may be insoluble in the base fluid of the downhole fluid being treated. The downhole fluid may be a water-based fluid. The lubricant formed in the fluid may have thermal stability at temperatures of 400 C or more. Alternatively, when added to the downhole fluid, the dispersion may have a thermal stability at temperatures of about 400 C or more, or about 400 C or more in another non-limiting embodiment.

The downhole fluid may include a sufficient quantity of the lubricant to form a lubricating film on the first surface, such as but not limited to a wellbore casing, a drill string, a pipe, a formation, a drill bit, a metal surface within a mud motor, formation evaluation tool, at least one drilling tool, and combinations thereof. The amount of the lubricant within the downhole fluid may range from about 0.25 vol % independently to about 10 vol %, alternatively from about 0.5 vol % to about 5 vol %, or from about 1 vol % independently to about 4 vol %, where "independently" as used herein means that any lower threshold may be combined with any upper threshold to define an acceptable alternative range.

The lubricant may include a metal stearate and PTFE. The metal stearate may be, but is not limited to lithium stearate, sodium stearate, potassium stearate, rubidium stearate, and cesium stearate, and combinations thereof in one non-limiting embodiment. The amount of the metal stearate within the lubricant may range from 1 lbm/bbl independently to about 10 lbm/bbl of the total lubricant, alternatively from about 1 lbm/bbl independently to about 8 lbm/bbl, or from about 1 lbm/bbl independently to about 4 lbm/bbl in another non-limiting embodiment. The PTFE within the lubricant may range from in amount from about 1 lbm/bbl to about 10 lbm/bbl, alternatively from about 1 lbm/bbl independently to about 8 lbm/bbl, or from about 1 lbm/bbl independently to about 4 lbm/bbl in another non-limiting embodiment. The amount of the metal stearate may be the same or different as the amount of the PTFE.

In another non-limiting embodiment, the lubricant may be or include LATILUBE™, which is a lubricant that also contains TEFLON™ and is distributed by Baker Hughes. When LATILUBE™ is part of the lubricant, it may be used in water-based fluids in an amount ranging from about 0.5 vol % independently to about 1 vol % of the downhole fluid. Alternative dosages may be dictated by specific well conditions and fluid dilution.

The lubricant may be used as an integral component of existing downhole fluid formulations. The lubricant also may be added to a downhole fluid during drilling operations, completion operations, and/or fracturing operations by a method known to those skilled in the art. For example, the lubricant may be injected into the pump suction, or may be added to a mud pit. The lubricant may be used with water-based downhole fluids. The phrase "water-based" includes any downhole fluid comprising water or a water-based solution as the continuous phase, including oil-in-water and oil-in-brine emulsions.

The downhole fluid may include polymers that are capable of viscosifying the downhole fluid and/or providing filtration control for the downhole fluid, e.g. a drilling fluid. The polymers may be non-toxic and depend upon the base fluid of the downhole fluid. The lubricant is compatible with most additives used in high temperature mud systems, including acrylamide based polymers and copolymers.

In one non-limiting embodiment, a water-based drilling fluid for use with the lubricant is a "high temperature" drilling fluid system. High temperature drilling fluids may include a combination of acrylamide alkyl alkane sulfonate(s) and dialkyl acrylamides, and combinations thereof, or a combination of acrylamide methyl propane sulfonate (AMPS), dimethyl acryamide (DMA), and a combination thereof.

Conventional additives may be used in the downhole fluid, including but are not necessarily limited to shale stabilizer(s), filtration control additive(s), suspending agent(s), dispersant(s), thinner(s), anti-balling additive(s), lubricant(s), weighting agent(s), seepage control additive(s), lost circulation additive(s), penetration rate enhancer(s), corrosion inhibitor(s), acid(s), base(s), buffer(s), scavenger(s), gelling agent(s), soluble salts, biocides; one or more bridging and/or weighting agents may be added to the fluid, and combinations thereof. Suitable shale stabilizers include, but are not necessarily limited to glycols, inorganic salts, and encapsulating polymers, such as PHPA or acrylamide copolymers, alone or in aqueous solutions, and mixtures thereof. Suitable shale stabilizing inorganic salts include, but are not necessarily limited to alkali metal salts.

The downhole fluid is prepared using conventional procedures. The lubricant is effective at pH values of from 7 to about 13.5, alternatively from about 8.5 to about 10. The pH of the downhole fluid may be adjusted with a suitable alkaline material, including but not necessarily limited to alkali metal hydroxides and alkali metal acetates. The alkali metal acetates may be or include, but are not necessarily limited to, sodium acetate and potassium acetate. The alkali metal hydroxides may be or include, but are not necessarily limited to, sodium hydroxide and potassium hydroxide.

Surfactants are generally considered optional, but may be used to improve the quality of the dispersion of the lubricant within the downhole fluid. Such surfactants may be present in the downhole fluid in an amount ranging from about 0.1 vol % independently to about 5 vol %, alternatively from about 0.2 vol % independently to about 2 vol %.

Expected suitable surfactants may include, but are not necessarily limited to non-ionic, anionic, cationic, amphoteric surfactants and zwitterionic surfactants, janus surfactants, and blends thereof. Suitable nonionic surfactants may include, but are not necessarily limited to, alkyl polyglycosides, sorbitan esters, methyl glucoside esters, amine ethoxylates, diamine ethoxylates, polyglycerol esters, alkyl ethoxylates, alcohols that have been polypropoxylated and/or polyethoxylated or both. Suitable anionic surfactants may include alkali metal alkyl sulfates, alkyl ether sulfonates, alkyl sulfonates, alkyl aryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, and phosphate esters. Suitable cationic surfactants may include, but are not necessarily limited to, arginine methyl esters, alkanolamines and alkylenediamines. Suitable surfactants may also include surfactants containing a non-ionic spacer-arm central extension and an ionic or nonionic polar group. Other suitable surfactants may be dimeric or gemini surfactants, cleavable surfactants, janus surfactants and extended surfactants, also called extended chain surfactants.

The invention will be further described with respect to the following Examples which are not meant to limit the invention, but rather to further illustrate the various embodiments.

Example 1

FIG. 1 is a graph illustrating the results where the lubricity of water was compared to the lubricity of a water/LATILUBE™ mixture and water/LATILUBE™/lithium stearate mixture. The water was treated with 4% by volume of the LATILUBE™ lubricant and with 4% by volume of the LATILUBE™/lithium stearate lubricating mixture. The ratio of LATILUBE™ to lithium stearate within the LATILUBE™/lithium stearate lubricating mixture was 4 to 1. As noted by the graph, the lubricity of the water/LATILUBE™ mixture and the water/LATILUBE™/lithium stearate lubricant was much lower than the lubricity of water.

Example 2

Figure 2:
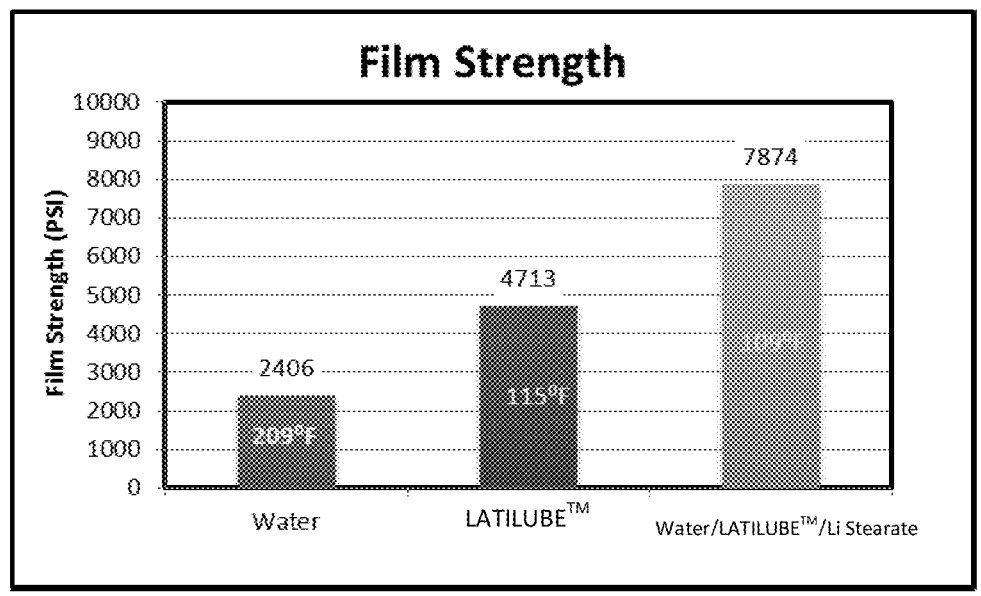
FIG. 2 is a graph illustrating the film strength of water as compared to the film strength measured for a water/LATILUBE™ mixture and a water/LATILUBE™/lithium stearate mixture.

FIG. 2 is a graph illustrating the film strength of water as compared to the film strength measured for a water/LATIL- UBE™ mixture, and a water/LATILUBE™/lithium stearate lubricating mixture. About 4% by volume of the LATILUBE™ lubricant was added to water to form the water/LATILUBE™ mixture. About 4% by volume of the LATILUBE™/lithium stearate lubricating mixture was added to water to form the water/LATILUBE™/lithium stearate mixture. The ratio of LATILUBE™ to lithium stearate within the LATILUBE™/lithium stearate lubricating mixture was 4 to 1. There was a significant improvement in film strength on the Extreme Pressure lubricity test (also known as 'EP lubricity test' by those skilled in the art) with the lubricant treated water. These tests were conducted at 150 inch ponds applied pressure at 1000 RPM for a duration of five minutes. The temperatures were monitored during the test. The final temperature recorded for each mixture is displayed in FIG. 2. The scaring on the block in conjunction with the other test properties is used to calculate the shear strength. The water/LATILUBE™ lubricating mixture and the water/LATILUBE™/lithium stearate lubricating mixture had the lowest temperatures, and had the highest film strengths, as noted in FIG. 2.

Example 3

Figure 3:
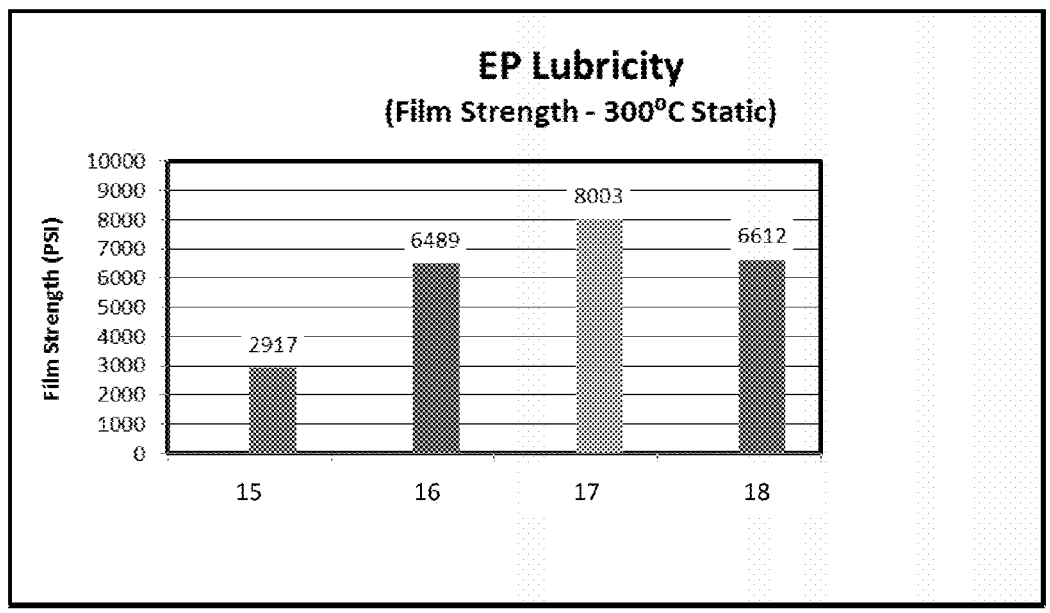
FIG. 3 is a graph illustrating the film strength of a base mud, as well as three samples of base mud where each sample was conditioned with a different lubricant formulation after aging the fluids at 300° C.

FIG. 3 is a graph illustrating the film strength of a base mud, as well as three samples of base mud where each sample was conditioned with a different lubricant formulation after aging the fluids at 300° C. Formulation 15 was the base mud, i.e. PYRODRILL™ that is distributed by Baker Hughes. Formulation 16 included 4.5 pounds per barrel (ppb) equivalent of LATILUBE™/lithium stearate lubricant. The ratio of LATILUBE™ to lithium stearate within the LATILUBE™/lithium stearate lubricating mixture was 4 to 1. Formulation 17 included 4% by volume of LATILUBE™. Formulation 18 included 4% by volume of a liquid lubricant containing lithium stearate/PTFE. As noted by the graph, all of the formulations having a lubricant therein had a higher film strength than the water alone. Specifically, formulation 17 had the highest film strength in this evaluation.

Example 4

Figure 4:
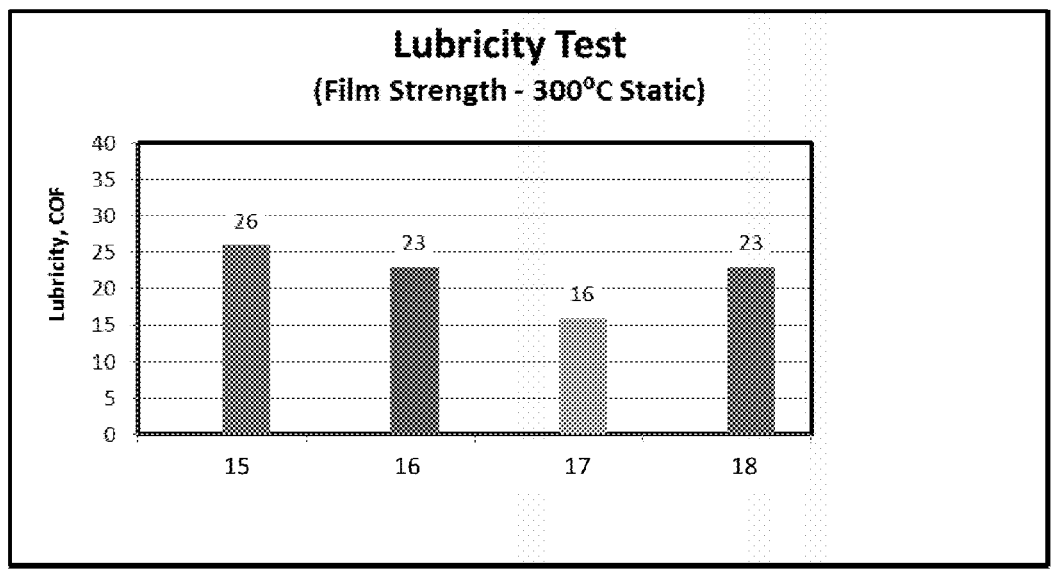
FIG. 4 is a graph illustrating the results of a lubricity test comparing the lubricity of the base mud with three samples of base mud where each sample had a different lubricant formulation added thereto.

FIG. 4 is a graph illustrating the results of a lubricity test comparing the lubricity of the base mud with three samples of base mud where each sample had a different lubricant formulation added thereto. The components of formulations 15-18 are the same components as those mentioned in EXAMPLE 3. As noted by the graph, formulation 17 had the lowest lubricity.

Example 5

Figure 5:
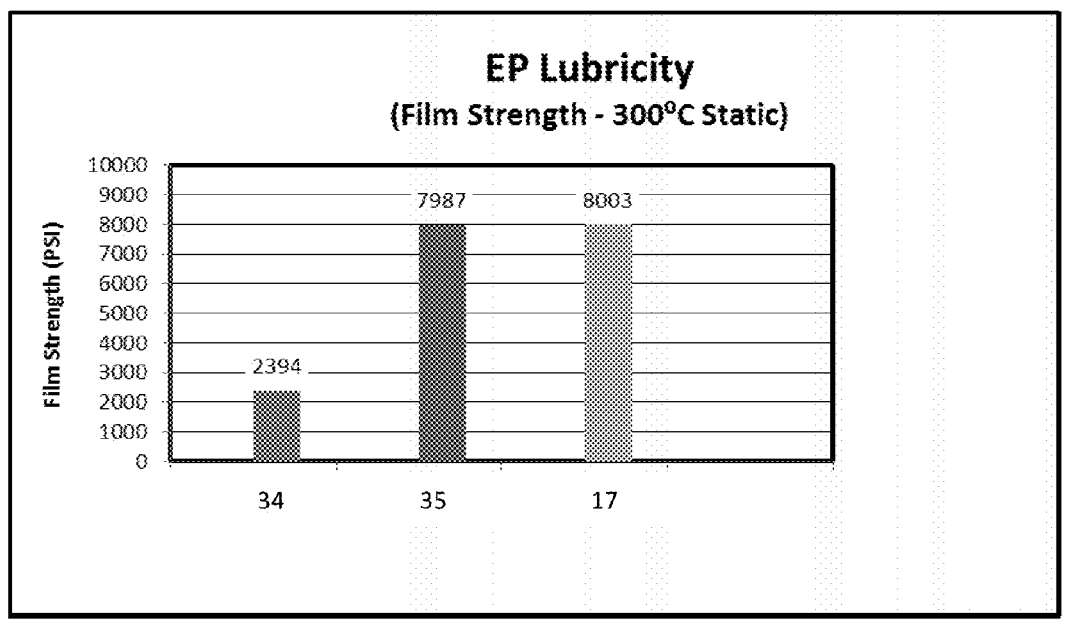
FIG. 5 is a graph illustrating the film strength of the base mud, as well as two samples of mud where each sample was conditioned with a different lubricant mixture after aging the fluids at 300° C.

FIG. 5 is a graph illustrating the film strength of the base mud, as well as two samples of mud where each sample was conditioned with a different lubricant mixture after aging the fluids at 300° C. Formulation 34 was PYRODRILL™, a base mud, that is distributed by Baker Hughes. Formulation 35 was the base mud with approximately 4 vol % of the LATILUBE™/lithium stearate lubricating mixture. The ratio of LATILUBE™ to lithium stearate within the LATILUBE™/lithium stearate lubricating mixture was 4 to 1. Formulation 17 was a base mud with 4 vol % of LATILUBE™. These tests were conducted at 150 inch ponds applied pressure at 1000 RPM for a five minute duration. The temperatures were monitored during the test. The final temperature recorded for each mixture is displayed on the graph. Both formulations having a lubricant therein had a higher film strength than the base mud alone.

Example 6

Several muds were tested having various components, and the scar wear and torque were measured. The base mud was PYRODRILL™, which is distributed by Baker Hughes. The types of muds had no lubricant, or they had a lubricant that may have included lithium stearate, lithium stearate and PTFE, or LATILUBE™, as indicated. The tests were performed using a 440 C ball material with an RPM of 700 at a load of 392N. The components of each mud and its respective results are listed in TABLE 1 below. The components were mixed by a method known to those skilled in the art of mixing drilling fluids. As noted in TABLE 1, the muds with the lubricant that included lithium stearate and PTFE had lower scar wears and torque readings than the fluids with the lubricant that included lithium stearate without the PTFE. The fluids having the LATILUBE™ lubricant had the lowest scar wears and torque readings as compared to the other lubricants.

TABLE 1

|   | Fluid | Wear Scar Ave in. | Torque Ave. |
|---|---|---|---|
| 1 | distilled water | 0.0555 | 1.55 |
| 2 | base mud | 0.0659 | 0.891 |
| 3 | Base Mud + Li Stearate | 0.0331 | 0.461 |
| 4 | Base Mud + LATILUBE ™ | 0.0184 | 0.201 |
| 5 | Base Mud + Li Stearate + PTFE | 0.0274 | 0.267 |
| 6 | Base Mud + Li Stearate | 0.0326 | 0.318 |
| 7 | Base Mud + LATILUBE ™ | 0.0225 | 0.158 |
| 8 | Base Mud + Li Stearate + PTFE | 0.0277 | 0.243 |
| 9 | distilled water | 0.055 | 1.116 |
| 10 | base mud | 0.0644 | 0.617 |
| 11 | Pyro-Drill + Li Stearate Aged 24 hr @ 300 C. | 0.0336 | 0.245 |
| 12 | Pyro-Drill Base Aged 24 hr @ 300 C. | 0.0551 | 0.495 |
| 13 | Pyro-Drill + LATILUBE ™ Aged 24 hr @ 300 C. | 0.025 | 0.157 |
| 14 | Pyro-Drill + Li Stearate + PTFE Aged 24 hr @ 300 C. | 0.0334 | 0.258 |

In the foregoing specification, the invention has been described with reference to specific embodiments thereof, and has been described as effective in providing methods and fluid compositions for circulating a downhole fluid within a subterranean reservoir wellbore and lubricating a first surface where the downhole fluid includes a lubricant having a metal stearate and PTFE. However, it will be evident that various modifications and changes can be made thereto without departing from the broader spirit or scope of the invention as set forth in the appended claims. Accordingly, the specification is to be regarded in an illustrative rather than a restrictive sense. For example, specific downhole fluids, metal stearates, surfaces, and temperatures falling within the claimed parameters, but not specifically identified or tried in a particular fluid composition or method, are expected to be within the scope of this invention.

The present invention may suitably comprise, consist or consist essentially of the elements disclosed and may be practiced in the absence of an element not disclosed. For instance, the method may consist of or consist essentially of a method for circulating a downhole fluid within a subterranean reservoir wellbore where the downhole fluid includes a lubricant having at least a metal stearate and PTFE, and thereby lubricating a first surface, such as but not limited to a wellbore casing, a drill string, a pipe, a formation, a drill bit, a metal surface within a mud motor, formation evaluation tool, at least one drilling tool, and combinations thereof. The fluid composition may include a downhole fluid consisting of or consisting essentially of a lubricant where the lubricant has at least a metal stearate in an amount ranging from about 1 lbm/bbl to about 10 lbm/bbl of the total lubricant and polytetrafluoroethylene (PTFE) in an amount ranging from about 1 lbm/bbl to about 10 lbm/bbl of the total lubricant.

The words "comprising" and "comprises" as used throughout the claims, are to be interpreted to mean "including but not limited to" and "includes but not limited to", respectively.

What is claimed is:

1. A method comprising:
    circulating a downhole fluid within a subterranean reservoir wellbore selected from the group consisting of a drilling fluid, a completion fluid, a fracturing fluid, a drill-in fluid, a workover fluid, and combinations thereof; wherein the downhole fluid has a lubricant comprising a metal stearate and a polytetrafluoroethylene (PTFE); and wherein the lubricant is present within the downhole fluid in an amount ranging from about 0.25 vol % to about 10 vol % of the total downhole fluid; and
    lubricating a first surface selected from the group consisting of a wellbore casing, a drill string, a pipe, a formation, a drill bit, a metal surface within a mud motor, formation evaluation tool, at least one drilling tool, and combinations thereof.

2. The method of claim 1 further comprising reducing at least one property selected from the group consisting of friction, torque, drag, wear, operating temperatures of the first surface, corrosion, and combinations thereof when the first surface contacts a second surface different from the first surface, wherein at least one of the surfaces is a metal surface, and wherein the temperature of the environment surrounding the surfaces is up to about 400 C.

3. The method of claim 1, wherein the lubricant comprises the metal stearate in an amount ranging from about 1 lbm/bbl to about 10 lbm/bbl of the total lubricant, wherein the lubricant comprises PTFE in an amount ranging from about 1 lbm/bbl to about 10 lbm/bbl of the total lubricant, and wherein the amount of the metal stearate may be the same or different from the amount of the PTFE.

4. The method of claim 1, wherein a stator of the mud motor does not comprise an elastomer.

5. The method of claim 1, wherein the downhole fluid is a water-based fluid.

6. The method of claim 1, wherein the metal stearate is lithium stearate.

7. A method comprising:
    drilling a subterranean reservoir wellbore with a drilling fluid comprising a lubricant in an amount ranging from about 0.25 vol % to about 10 vol % of the total drilling fluid; wherein the downhole fluid has a lubricant comprising a metal stearate and a polytetrafluoroethylene (PTFE); and
    reducing at least one property selected from the group consisting of friction, torque, drag, wear, operating temperatures of a first surface, corrosion, and combinations thereof when a first surface contacts a second surface; wherein the first surface is selected from the group consisting of a wellbore casing, a drill string, a pipe, a formation, a drill bit, a metal surface within a mud motor, formation evaluation tool, at least one drilling tool, and combinations thereof; and wherein at least one of the surfaces is a metal surface.

8. The method of claim 7, wherein the mud motor is a metal-metal directional motor and is configured to operate at a depth of about 15,000 meters below the surface.

9. The method of claim 8, wherein a stator of the metal-metal directional motor does not comprise an elastomer.

10. The method of claim 7, wherein the drilling is performed at a temperature up to about 400 C.

11. The method of claim 7, wherein the lubricant comprises the lithium stearate in an amount ranging from about 1 lbm/bbl to about 10 lbm/bbl of the total lubricant, wherein the lubricant comprises PTFE in an amount ranging from about 1 lbm/bbl to about 10 lbm/bbl of the total lubricant, and wherein the amount of the lithium stearate may be the same or different from the amount of the PTFE.

12. The method of claim 7, wherein the drilling fluid is a water-based fluid.

13. A downhole fluid comprising a lubricant in an amount ranging from about 0.25 vol % to about 10 vol % of the total downhole fluid, wherein the lubricant comprises:
    a. a metal stearate in an amount ranging from about 1 lbm/bbl to about 10 lbm/bbl of the total lubricant; and
    b. a polytetrafluoroethylene (PTFE) in an amount ranging from about 1 lbm/bbl to about 10 lbm/bbl of the total lubricant; and
    wherein the amount of the metal stearate is the same or different from the amount of the PTFE.

14. The downhole fluid of claim 13, wherein the metal stearate is lithium stearate.

15. The downhole fluid of claim 13, wherein the downhole fluid is selected from the group consisting of a drilling fluid, a completion fluid, a fracturing fluid, a drill-in fluid, a workover fluid, and combinations thereof.

16. The downhole fluid of claim 13, wherein the downhole fluid is a water-based fluid.

17. A water-based drilling fluid comprising a lubricant, wherein the lubricant comprises:
    a. lithium stearate in an amount ranging from about 1 lbm/bbl to about 10 lbm/bbl of the total lubricant; and
    b. polytetrafluoroethylene (PTFE) in an amount ranging from about 1 lbm/bbl to about 10 lbm/bbl of the total lubricant; and
    wherein the amount of the metal stearate is the same or different from the amount of the PTFE, and wherein the water-based drilling fluid comprises the lubricant in an amount ranging from about 0.25 vol % to about 10 vol % of the total water-based drilling fluid.

* * * * *